Aug. 2, 1966
T. EVANS ETAL
3,263,833
BALE LAUNCHER CONTROL
Filed Jan. 31, 1964
2 Sheets-Sheet 1
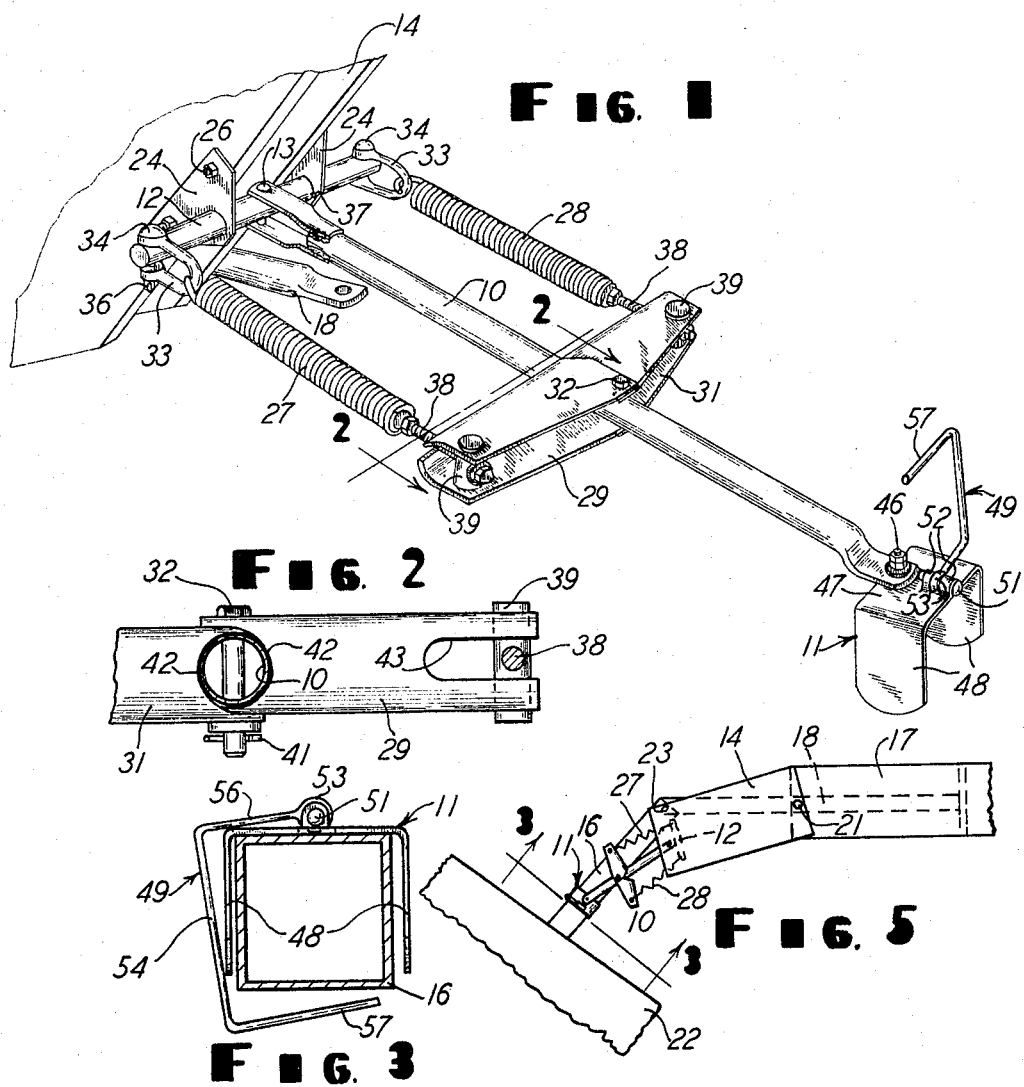
INVENTORS:
THOMAS EVANS
BOLIVER T. HARRIS
HOWARD D. HADLER
BY: Arthur J. Hansmann
ATTORNEY

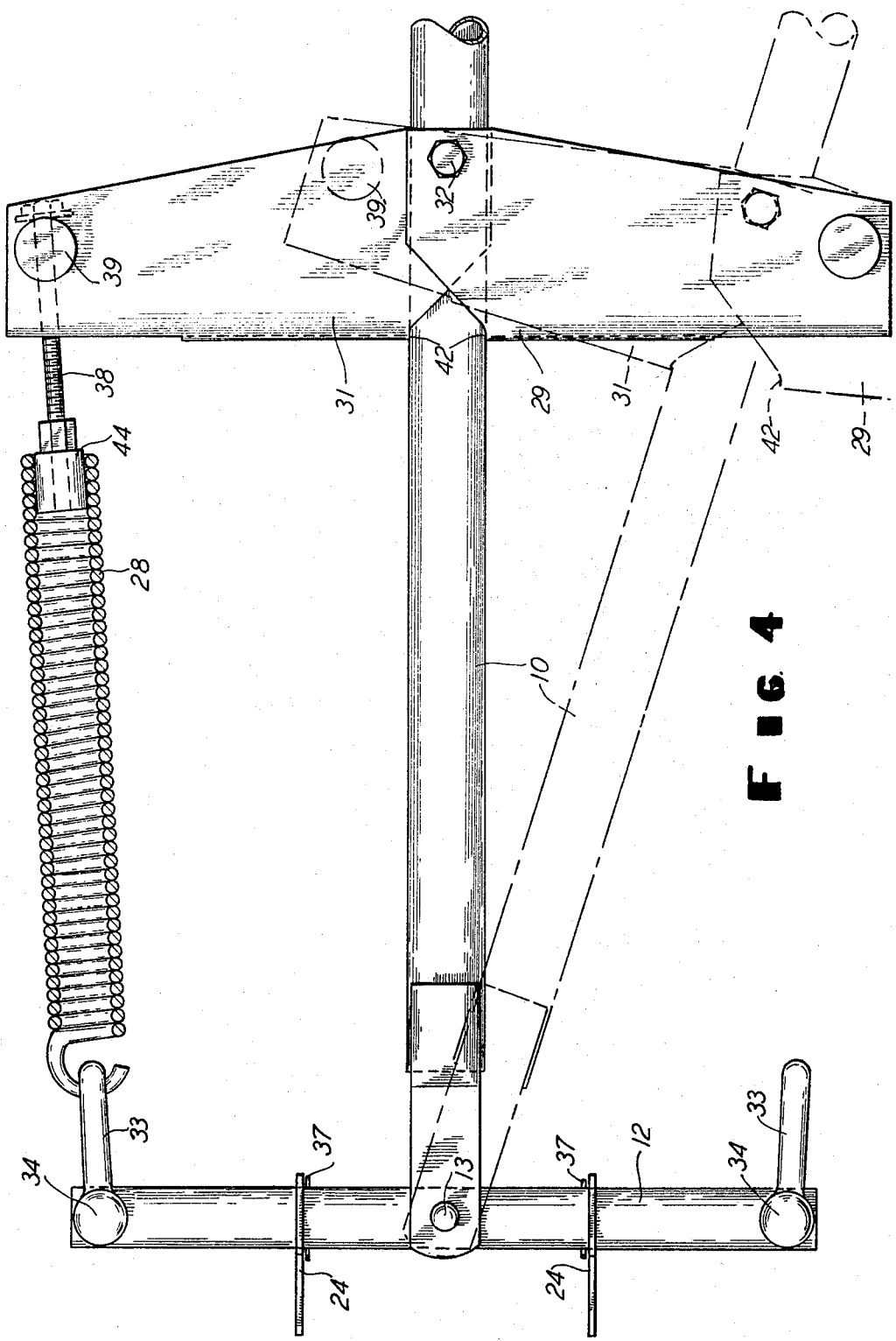

United States Patent Office 3,263,833
Patented August 2, 1966

3,263,833
BALE LAUNCHER CONTROL
Thomas Evans and Boliver T. Harris, Bettendorf, and Howard D. Hadler, Davenport, Iowa, assignors to J. I. Case Company, Racine, Wis., a corporation of Wisconsin
Filed Jan. 31, 1964, Ser. No. 341,570
12 Claims. (Cl. 214—42)

This invention relates to a bale launcher control, and more particularly it relates to a control or device for pivoting a bale launcher so that it will be aimed at the trailing wagon for the well known purpose of throwing the bales into the wagon.

Bale launcher controls disposed between a bale launcher and a trailing wagon are not entirely novel in the art. These controls are sometimes referred to as wagon followers or wagon guide devices in that the control or device is connected at one end to the tongue of the wagon and at the other end to the bale launcher so that any lateral offset of the wagon with respect to the longitudinal axis of the baler and the bale launcher will be detected by the follower or control and thus pivot the launcher to aim it at the wagon. In heretofore known controls or followers, springs have been utilized such that a coil spring for instance is employed intermediate an elongated device connected between the bale launcher and the wagon tongue, and the spring is thus bent or deflected upon pivotal movement of the wagon tongue and such deflection or force on the spring to create same causes pivotal movement of the bale launcher. Of course a spring is employed so that when the limit of pivotal movement of the launcher is reached then the spring will only bend further without damaging the launcher while the wagon tongue is actually at a more extreme pivotal condition or beyond the pivotal limit of the launcher. However, as mentioned, these prior devices utilizing springs have only a single coil spring which must therefore be located in an aligned position longitudinally with respect to the plane of the wagon tongue such that the spring is not deflected or offset when the wagon tongue is in the position of fore-and-aft alignment with the baler itself. This therefore requires specific location of the attachment of the follower to the bale launcher. Still further the use of a single spring means like the coil spring is used as a deflection member rather than a tension or compression member which is the more normal use of a coil spring. In these prior devices which utilize the single spring as a deflectable member, the spring continues to exert a force of increasing magnitude on the launcher when the wagon tongue passes beyond the pivotal position of limit of movement of the pivot of the launcher itself. Thus there is induced a strain on the launcher in proportion to the degree of angularity between the wagon tongue offset from its alignment with the baler. Still further, where the single spring is utilized, the spring must initially be aligned in the upright fore-and-aft plane of the wagon tongue in order to eliminate any initial tendency for the spring to pivot the bale launcher when of course it is desired that the launcher be at the central or neutral position.

Accordingly, it is a general object of this invention to provide a bale launcher control which is an improvement over controls or followers heretofore known.

Another object of this invention is to provide a bale launcher control which accurately detects the pivotal movement of a trailing wagon and translates that movement into pivotal movement of the bale launcher in both an accurate and sensitive manner so that the launcher is aimed toward the wagon as desired. In accomplishing this particular object, the preferred embodiment shown and described in this instance utilizes resilient means or springs which are disposed on torque arms and which are operable in the normal manner of spring use namely tension and of course in extension.

Still another object of this invention is to provide a bale launcher control which is sturdy in its construction and in its transmitting of forces to the bale launcher, but yet the control is arranged to be automatically limiting in the amount of force applied to the launcher when the latter is pivoted to its limit and thus the construction of the part is made accordingly and damage to the part and the launcher is minimal.

Still another object of this invention is to provide a bale launcher control which can be adjusted to transmit the desired pivoting force to the launcher for pivotal movement of the latter.

Still a further object of this invention is to provide a bale launcher control which is novel and an improvement with respect to those heretofore known in the arrangement and construction for attaching the control to the wagon tongue. In accomplishing this particular object, the construction permits ready attachment and detachment of the control to the wagon tongue and yet the construction is sturdy but relatively inexpensive and simple in its parts and of course is highly efficient in detecting pivotal movement of the wagon tongue. Also the construction permits secure attachment to the tongue as far as inadvertent release therefrom is concerned but yet it permits the desired sliding relation between the control and the wagon tongue.

Other objects and advantages become apparent upon reading the following description in light of the accompanying drawings wherein:

FIG. 1 is a side perspective view of a preferred control of this invention and showing a fragment of a bale launcher.

FIG. 2 is an enlarged sectional view taken on the line 2—2 of FIG. 1.

FIG. 3 is an enlarged sectional view taken transverse to the wagon tongue and showing the attaching end in FIG. 1, and the section is taken on the line 3—3 of FIG. 5.

FIG. 4 is an enlarged top plan view of a fragment of the control shown in FIG. 1, and the dot-dash lines show parts thereof in a different position.

FIG. 5 is a top plan view diagrammatically showing the preferred embodiment of this invention related to the baler, bale launcher, and the wagon.

The same reference numerals refer to the same parts throughout the several views.

The drawings show the device to generally comprise a tube 10 and a clevis 11 and a shaft 12 which is pivotally attached to the tube 10 by means of the pin 13. Thus the device is connected at one end to a bale launcher indicated 14 and the clevis 11 slidably attaches the other end of the device to the wagon tongue 16 as shown in FIG. 5. Thus this diagrammatic drawing indicates the conventional type baler 17 as having a rearwardly extending draft member 18 to which the wagon tongue 16 is pivotally attached. Also shown is the bale launcher 14 which is pivotally mounted on the baler 17 through the pivot pin 21. It will of course further be understood that the degree of pivot between the launcher 14 and the baler 17 is limited, and this will be further mentioned later. Of course the wagon 22 is suitably connected to the wagon tongue 16 so that the entire train including the baler 17, the bale launcher 14, and the wagon 22 are in trailing relation to each other as the baler 17 moves forward in the usual manner and for the purpose of course of picking up hay to be baled and passed to the launcher 14 which in turn throws the baled hay into the wagon 22.

FIG. 5 of course shows the three components of the combination in pivoted relationship which simulates a right turn being made by the baler 17. It will also then be understood that the baler draft member 18 and the wagon tongue 16 are pivoted together by the pin indicated at 23.

Referring to FIG. 1, it will be noted that the control is attached to the launcher 14 by a pair of side plates 24 being secured to the launcher through bolts, such as those shown bolts 26. The plates 24 rotatably support the shaft or transverse member 12 which is therefore connected with respect to the bale launcher 14.

It will also be now understood that the tube 10 is an elongated member which is horizontally pivotal with respect to the bale launcher 14 by means of the pin 13 which is utilized to connect the transverse member 12 and the elongated member 10 as shown. Tension springs 27 and 28 are connected at their respective ends to the rod 12 and to projections or wing members 29 and 31 which are pivotally mounted on the tube 10 by the pivot pin 32. Thus the ends of the springs 27 and 28 connect to clevises 33 which are pivotally pinned to the ends of the shaft 12 by the pins 34. It will also be understood that cotter pins 36 hold the pins 34 to the shaft 12, and cotter pins, such as the shown pin 37, hold the shaft 12 axially with respect to the plates 24 as the pins 37 are located adjacent the plates 24 as indicated.

The other ends of the springs 27 and 28 have adjusting screws 38 secured thereto and also secured to trunnions 39 in the extended ends of the members 29 and 31. The trunnions 39 are rotatable on the members 29 and 31 so that there will be no bending or deflection of the springs 27 and 28 as the tube 10 pivots on its pivot pin 13. It is also significant to note that with the provision of the screws 38, the tension in the springs 27 and 28 can be controlled and is of course adjustable to control all the force applied by each of the springs 27 and 28 upon the bale launcher 14.

FIGS. 1 and 2 particularly show that the members 29 and 31 overlap each other at their inner ends and they are of course secured to the tube 10 by the pivot pin 32 which is held by the cotter pin 41. The figures also show that the members 29 and 31 are each formed of a single sheet material which is bent into a U shape and has an arcuate edge 42 which abuts the circumference of the tube 10 as shown in FIG. 2. Thus the members 29 and 31 are limited in their pivotal movement in one direction, but of course the members can pivot in a direction to move the surfaces 42 away from the tube 10 in a manner described later.

The members 29 and 31 also have end openings 43 which provide for the passage of the screws 38 to connect of course to the trunnions 39 as mentioned. FIG. 4 of course shows the screw 38 extending diametrically through the trunnion 39 and into a connector or plug 44 disposed in the spring 28. Thus the screw 38 is threadedly adjustable in the plug 44 to vary the effective length of the spring and the screw and the clevis 33 between the pivot pin 34 and the trunnion 39 to thereby vary the tension on the spring or exertable by the spring 28.

The tube 10 is pivotally connected to the clevis 11 by the pivot bolt or pin 46, and it will of course be noted that the clevis 11 has the intermediate or horizontal portion 47 and the two depending leg portions 48. Thus with reference to FIGS. 3 and 5, it will be seen that the clevis 11 can be disposed over the wagon tongue 16 to have the clevis leg portions 48 confine the wagon tongue so that pivotal movement of the latter will of course carry the clevis 11 with the wagon tongue and thereby transmit the pivotal movement to the tube 10. To secure the attachment between the tube 10 and the wagon tongue 16 in the vertical direction, a bail or additional U-shaped member 49 is pivotally mounted on the U-shaped clevis 11 by means of a pivot pin 51 extending through bosses 52 upstanding on the clevis portion 47. Thus the bail piece 49 has an enlarged end 53 which of course has an opening for reception of the pin 51 so that the piece 49 is pivotal on the pin 51 and can be pivoted between the position shown in FIG. 1 and the position shown in FIG. 3. Of course in the latter position the bale launcher control is slidably but securely connected to the wagon tongue 16 in the desired manner so that the device can slide along the tongue 16 but will not be disconnected from the tongue until the bail 49 is moved from the secured position in FIG. 3 to the released position of FIG. 1 and of course the clevis 11 is then raised off the tongue 16.

With this construction of the connection between the control and the wagon tongue 16, an improved connector is provided, and it is of course secure in both the horizontal and vertical direction against inadvertent release from the tongue 16. In this construction the bail 49 of course consists of the intermediate portion 54 and the leg portions 56 and 57 with the latter being disposed beneath the tongue 16 to preclude the vertical displacement of the connection as mentioned, and it is then C-shaped.

FIG. 4 shows the components of this embodiment in both a neutral or central position in solid lines and in a pivoted position in dot-dash lines. This therefore shows that when the member 10 is pivoted to for instance the dot-dash position shown, then the projection or wing member 31 is maintained in its limited pivotal position with respect to the tube 10 and thus the spring 28 is placed under tension as the pin 34 remains in its position while the trunnion 39 rotates or moves to its dot-dash position. This of course creates a pull on the bale launcher 14 on the side of the spring 28 to pivot the launcher in the direction of pivot of the tube 10.

At the same time, the opposite spring 27 is actually being placed under a tendency to compress as its pivot point 34 remains fixed while its trunnion 39 pivots inwardly about the main pivot point 13. Thus the member 29 is is free to pivot away from the tube 10 as its surface indicated 42 in FIG. 4 is shown moved away from the tube 10. Thus this arrangement permits relief of the inactive spring and the column characteristic of the spring 27 is not applied to the launcher 14 but only the tension of the spring 28 is utilized for desired pivot of the launcher 14.

Another desirable feature of this construction is the fact that when the launcher 14 reaches its limit of pivot it is desired to reduce the likelihood of damaging the launcher by continuing to pull on it. To accomplish this, it will be seen that as the control pivots about the point 13 the spring 28 moves toward the pivot 13 and thus the line of action longitudinally of the spring 28 moves toward the pivot 13 and thus the length of the moment arm between the pivot point 13 and the spring 28 is reduced in direct proportion to the pivot of the member 10 and thus the elongation of the spring 28. Therefore the ultimate torque applied to the launcher 14 by the spring 28 is of course not increased in proportion to the pivot of the member 10 which must completely follow the pivot of the wagon tongue 16, but instead the torque is limited as the described moment arm is reduced, and this is so even though the spring 28 is continued to be placed under greater tension.

FIG. 5 shows the position of the parts upon pivotal movement of the wagon tongue 16 and thus the tube 10 in a direction opposite to that shown in FIG. 4. It will therefore again be noted that the spring to the side in the direction of pivotal movement is inactive and completely relieved while the other spring is active and provides the necessary force on the launcher 14 to pivot it as desired. Thus this is termed a lost motion with respect to the inoperative spring. It will also be understood that by virtue of the adjustability of the springs through the screws 38, the longitudinal location of the tube 10 can be either offset from or aligned with the upright longitudinal plane of the draft member 18.

While a specific embodiment of this invention has been shown and described, it should be obvious that certain changes could be made in the embodiment, and the invention should therefore be limited only by the scope of the appended claims.

What is claimed is:

1. In a baler and bale launcher, the combination comprising a baler, a bale launcher pivotally connected to said baler, a trailing wagon which has a tongue pivotally connected to said baler, a member operatively interconnectable between both said bale launcher and said wagon tongue to be pivotally movable with the latter and to be horizontally pivotal with respect to said bale launcher, and a pair of resilient means operatively connected to said member and disposed one on each side of said member and adapted to be respectively flexed upon horizontal pivotal movement of said member and being operatively interconnectable with said bale launcher to yieldingly pivot the latter in the direction of horizontal pivot of said member and to a degree less than the simultaneous pivot of said wagon tongue.

2. In a baler and bale launcher, the combination comprising a baler, a bale launcher pivotally connected to said baler, a trailing wagon which has a tongue pivotally connected to said baler, a member operatively interconnected between said bale launcher and said wagon tongue and pivotally movable with the latter and slidable therealong and horizontally pivotal with respect to said bale launcher, and an extensible resilient means disposed on each side of said member and being operatively connected thereto and adapted to be respectively resiliently extended upon horizontal pivotal movement of said member and with both said means being operatively connected to said bale launcher at horizontally spaced apart points thereon to alternately yieldingly pivot the latter in the direction of horizontal pivot of said member.

3. A bale launcher control for use between a pivotal bale launcher and a trailing wagon which has a togue pivotal with respect to the bale launcher, comprising in combination a member operatively interconnectable between both the bale launcher and the wagon tongue to be pivotally movable with the latter and to be horizontally pivotal with respect to the bale launcher, and a resilient means disposed on each side of said member and operatively connected thereto and with both said means having a free length and being changeable in at least one direction of said length, and adapted to be respectively flexed upon horizontal pivotal movement of said member and being operatively interconnectable with said bale launcher to yieldingly pivot the latter in the direction of horizontal pivot of said member, both said resilient means being connected to said member in a fixed relation in said one direction of the length of said means and in a lost-motion relation in the direction opposite to said one direction.

4. A bale launcher control for use between a pivotal bale launcher and a trailing wagon which has a tongue pivotal with respect to the bale launcher, comprising in combination an elongated member operatively interconnectable between both the bale launcher and the wagon tongue to be pivotally movable with the latter and to be horizontally pivotally with respect to the bale launcher, projections movably connected to said member and extending laterally and on opposite sides of said member and being movable on said member in the direction away from said bale launcher from one limit position on said member, and a tension member disposed on each side of said member and being respectively connected to said projections and each said tension member adapted to be respectively stretched upon horizontal pivotal movement of said member to the side away from said each of said tension members and said tension members being operatively interconnectable with said bale launcher to yieldingly pivot the latter in the direction of horizontal pivot of said member.

5. In a combined baler, bale launcher and trailing wagon, the combination comprising a baler, a bale launcher horizontally pivotally connected to said baler in a trailing position, a wagon horizontally pivotally attached to said baler and being in a trailing position with respect to said bale launcher, a member operatively interconnected between both said bale launcher and said wagon to be pivotally movable with the latter and to be horizontally pivotal with respect to said bale launcher, and a resilient member disposed on each side of said member and being respectively connected thereto and adapted to be respectively flexed upon horizontal pivotal movement of said member and with said resilient members being operatively member and with said resilient members being operatively interconnectable with said bale launcher to yieldingly pivot the latter in the direction of horizontal pivot of said member.

6. A bale launcher control for use between a pivotal bale launcher and a trailing wagon which has a tongue pivotal with respect to the bale launcher, comprising in combination an elongated member operatively interconnectable between both the bale launcher and the wagon tongue to be pivotally movable with the latter and to be horizontally pivotal with respect to the bale launcher, projections pivotally mounted on said member and extending laterally and on opposite sides of said member and being pivotal on said member in the direction away from said bale launcher from one limit position on said member, and a tension spring disposed on each side of said member and being respectively connected to said projections and with each said tension spring being adapted to be respectively stretched upon horizontal pivotal movement of said member to the side away from said each of said tension springs and with said tension springs being operatively interconnectable with said bale launcher to yieldingly pivot the latter in the direction of horizontal pivot of said member.

7. A bale launcher control for use between a pivotal bale launcher and a trailing wagon which has a tongue pivotal with respect to the bale launcher, comprising in combination an elongated member with one end thereof operatively connectable to the wagon tongue to be pivotally movable with the latter, a transverse member mountable on said bale launcher and extendable laterally thereon and being relatively horizontally pivotally attached to the other end of said elongated member, projections movably connected to said elongated member and extending laterally and on opposite sides of said elongated member and being movable on said elongated member in the direction away from said bale launcher from one limit position on said elongated member, and a tension spring disposed on each side of said elongated member and being respectively connected to said projections and with each of said tension springs adapted to be respectively stretched upon horizontal pivotal movement of said elongated member to the side away from said each of said tension springs and with said tension springs being respectively operatively interconnected to the opposite ends of said transverse member to yieldingly pivot said bale launcher in the direction of horizontal pivot of said elongated member.

8. In baling apparatus, the combination of a pivotal bale launcher and a trailing wagon which has a tongue pivotal with respect to the bale launcher, an elongated member operatively interconnected between both said bale launcher and said wagon tongue to be pivotally movable with the latter and to be horizontally pivotal with respect to said bale launcher about a pivot point on the latter, projections respectively mounted on said member and extending laterally and on opposite sides of said member, and a tension spring disposed on each side of said member and being respectively connected to the extending ends of said projections and with each said tension spring being connected to said bale launcher on opposite sides of said pivot point and adapted to be respectively stretched upon horizontal pivotal movement of said member to the side away from each of said tension springs to yieldingly pivot said bale launcher in the direction of horizontal pivot of said member and to thereby reduce the moment arm of said each of said tension springs in proportion to the degree of pivot of said member.

9. A bale launcher control for use between a pivotal bale launcher and a trailing wagon which has a tongue pivotal with respect to the bale launcher, comprising in combination a member operatively interconnectable between both the bale launcher and the wagon tongue to be pivotally movable with the latter to be horizontally pivotal with respect to the bale launcher, and a resilient means operatively connected to said member and disposed on each side of said member and adapted to be respectively flexed upon horizontal pivotal movement of said member and being operatively interconnectable with said bale launcher to yieldingly pivot the latter in the direction of horizontal pivot of said member, and adjustment means separately operatively connected to each of said resilient means and being independent of each other for separately adjusting the effective flexibility of said each of said resilient means.

10. A bale launcher control for use between a pivotal bale launcher and a trailing wagon which has a tongue pivotal with respect to the bale launcher, comprising in combination a member operatively interconnectable between both the bale launcher and the wagon tongue to be pivotally movable with the latter to be pivotable with respect to the bale launcher, and a resilient means operatively connected to said member and disposed on each side of said member and adapted to be respectively flexed upon pivotal movement of said member and being operatively interconnectable with said bale launcher to yieldingly pivot the latter in the direction of pivot of said member, a clevis attached to said member and including two portions adapted to be disposed on opposite sides of said wagon tongue to abut said sides upon horizontal pivotal movement of said wagon tongue, and a latch member pivotally mounted on said clevis and depending therefrom in a portion extendable underneath said wagon tongue to abut said wagon tongue upon vertical pivotal movement of said clevis relative to said wagon tongue.

11. In a slidable attachment between a bale launcher and a wagon tongue, the combination comprising a U-shaped member with three portions and invertedly slidably positionable over the wagon tongue for restricting relative movement between said U-shaped member and the wagon tongue in the three directions of the three portions of said U-shaped member, a member attached to said U-shaped member and being connectable to the bale launcher, and a latch movably attached to said U-shaped member and being movable thereon between a position in the opening between legs of said U-shaped member and a position out of said opening for respectively restricting and clearing relative movement between said U-shaped member and the wagon tongue in the direction of said latch.

12. In a slidable attachment between a bale launcher, and a wagon tongue, the combination comprising an inverted U-shaped member adapted to extend on three sides of the wagon tongue, a member attached to said U-shaped member and being connectable to the bale launcher, and a C-shaped member pivotally attached at one end to said U-shaped member on the intermediate portion of the latter and adapted to extend around one leg of said U-shaped member with the other end of said C-shaped member extending in the opening between the legs of said U-shaped member to thereby slidably enclose the wagon tongue on all sides with both said shaped members.

References Cited by the Examiner
UNITED STATES PATENTS

| 1,864,324 | 6/1932 | Stedman | 280—488 |
| 2,732,959 | 1/1956 | De Penning | 214—42 |
| 3,090,509 | 5/1963 | Muehlhausen | 214—42 |

LEO FRIAGLIA, *Primary Examiner.*